US012276404B1

(12) United States Patent
Xu et al.

(10) Patent No.: US 12,276,404 B1
(45) Date of Patent: Apr. 15, 2025

(54) LED LAMP WITH PANEL LOCKING ASSEMBLY

(71) Applicant: SHENZHEN SNC OPTO ELECTRONIC CO., LTD., Guangdong (CN)

(72) Inventors: Jianyong Xu, Guangdong (CN); Gang Mao, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/644,064

(22) Filed: Apr. 23, 2024

(30) Foreign Application Priority Data

Dec. 26, 2023 (CN) ........................ 202323549703.3

(51) Int. Cl.

| | |
|---|---|
| ***F21V 17/02*** | (2006.01) |
| ***F21S 8/04*** | (2006.01) |
| ***F21V 5/04*** | (2006.01) |
| ***F21V 17/16*** | (2006.01) |
| ***F21V 21/08*** | (2006.01) |
| ***F21V 29/70*** | (2015.01) |
| *F21Y 115/10* | (2016.01) |

(52) U.S. Cl.
CPC .............. *F21V 17/02* (2013.01); *F21S 8/043* (2013.01); *F21V 5/04* (2013.01); *F21V 17/166* (2013.01); *F21V 21/0832* (2013.01); *F21V 29/70* (2015.01); *F21Y 2115/10* (2016.08)

(58) Field of Classification Search
CPC . F21V 19/004; F21V 7/02; F21V 7/06; F21V 7/20; F21V 7/166; F21V 5/04; F21S 8/043
See application file for complete search history.

(56) References Cited

U.S. PATENT DOCUMENTS

| | | | | |
|---|---|---|---|---|
| 6,116,749 | A * | 9/2000 | Quiogue | F21V 23/02 362/147 |
| 11,156,343 | B1 * | 10/2021 | Kloepple | F21V 5/00 |
| 12,055,283 | B1 * | 8/2024 | Zhang | F21V 5/007 |
| 2001/0002167 | A1 * | 5/2001 | Rao | F21V 17/20 362/277 |
| 2007/0147054 | A1 * | 6/2007 | Bornhorst | F21V 14/06 362/428 |
| 2016/0018088 | A1 * | 1/2016 | Guo | F21V 17/164 362/455 |
| 2017/0234520 | A1 * | 8/2017 | Yu | F21V 5/04 362/294 |
| 2021/0247035 | A1 * | 8/2021 | Lim | F21V 5/002 |

* cited by examiner

*Primary Examiner* — Tracie Y Green
*Assistant Examiner* — Michael Chiang

(57) ABSTRACT

An LED lamp includes a heat dissipation lamp holder; an LED lamp panel mounted on a front side of the heat dissipation lamp holder; a light transmitting panel covering the LED lamp panel; and a locking assembly including: an engaging member movably mounted on the heat dissipation lamp holder; a button hinged to the heat dissipation lamp holder; and a first elastic resetting member connected to the button and abutting against the heat dissipation lamp holder. The button is provided with a connecting portion engaged with the engaging member to enable the engaging member to lock the light transmitting panel, when the button is pressed, the first elastic resetting member is compressed, and the connecting portion is disengaged from the engaging member, so that the engaging member unlocks the light transmitting panel.

9 Claims, 9 Drawing Sheets

LED LAMP WITH PANEL LOCKING ASSEMBLY

CROSS-REFERENCE TO RELATED APPLICATIONS

This application claims priority of Chinese Patent Application No. 2023235497033, filed on Dec. 26, 2023, entitled "LED LAMP", the entire content of which is incorporated herein in its entirety.

TECHNICAL FIELD

The present disclosure relates to lighting devices, and in particular to an LED lamp.

BACKGROUND

LED lamps have many advantages such as energy saving, environmental protection, long life, and have been widely used in various lighting places. The conventional LED lamp generally includes a lens panel in a light-emitting direction of the LED lamp panel, and the existing lens panel is fixed to a radiator by screws. When the lens panel needs to be replaced according to the requirement of a use place or the LED lamp needs to be repaired, it is necessary to use a screwdriver to remove the lens panel, which is very inconvenient and inefficient. Therefore, it is necessary to improve a structure of the LED lamp.

SUMMARY

Accordingly, the present disclosure provides an LED lamp, a light transmitting panel of which can be replaced without an additional tool.

An LED lamp includes a heat dissipation lamp holder; an LED lamp panel mounted on a front side of the heat dissipation lamp holder; a light transmitting panel covering the LED lamp panel; and a locking assembly including: an engaging member movably mounted on the heat dissipation lamp holder; a button hinged to the heat dissipation lamp holder; and a first elastic resetting member connected to the button and abutting against the heat dissipation lamp holder. The button is provided with a connecting portion engaged with the engaging member to enable the engaging member to lock the light transmitting panel, when the button is pressed, the first elastic resetting member is compressed, and the connecting portion is disengaged from the engaging member, so that the engaging member unlocks the light transmitting panel.

In one of the embodiments, the engaging member includes a pressing frame and an engaging ring, the pressing frame presses against the light transmitting panel and is hinged to the heat dissipation lamp holder, an edge of the pressing frame is provided with a groove, the engaging ring is fixedly mounted on the heat dissipation lamp holder, the engaging ring is provided with an opening, the button is provided in the opening, when the connecting portion is engaged with the engaging member, the connecting portion is engaged in the groove.

In one of the embodiments, the button is provided with a first connecting column, the heat dissipation lamp holder is provided with a column hole corresponding to the first connecting column, the first connecting column is rotatably received in the column hole, and the first elastic resetting member is sleeved on the first connecting column.

In one of the embodiments, the pressing frame is provided with a second connecting column, the heat dissipation lamp holder is provided with a column groove corresponding to the position of the second connecting column, and the second connecting column is rotatably received in the column groove.

In one of the embodiments, the locking assembly further includes a second elastic resetting member sleeved on the second connecting column, and both ends of the second elastic resetting member abuts against the pressing frame and the heat dissipation lamp holder, respectively.

In one of the embodiments, both the first elastic resetting member and the second elastic resetting member are torsion springs.

In one of the embodiments, two first elastic resetting members and two buttons are provided.

In one of the embodiments, the LED lamp further includes a driving power supply mounted on a back side of the heat dissipation lamp holder and electrically connected to the LED lamp panel; and a hook connected to the driving power supply.

In one of the embodiments, the light transmitting panel is a lens panel.

In one of the embodiments, the LED lamp further includes a sealing ring provided between the light transmitting panel and the LED lamp panel.

These and other objects, advantages, purposes and features will become apparent upon review of the following specification in conjunction with the drawings.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

REFERENCE SIGNS

Figure 1:
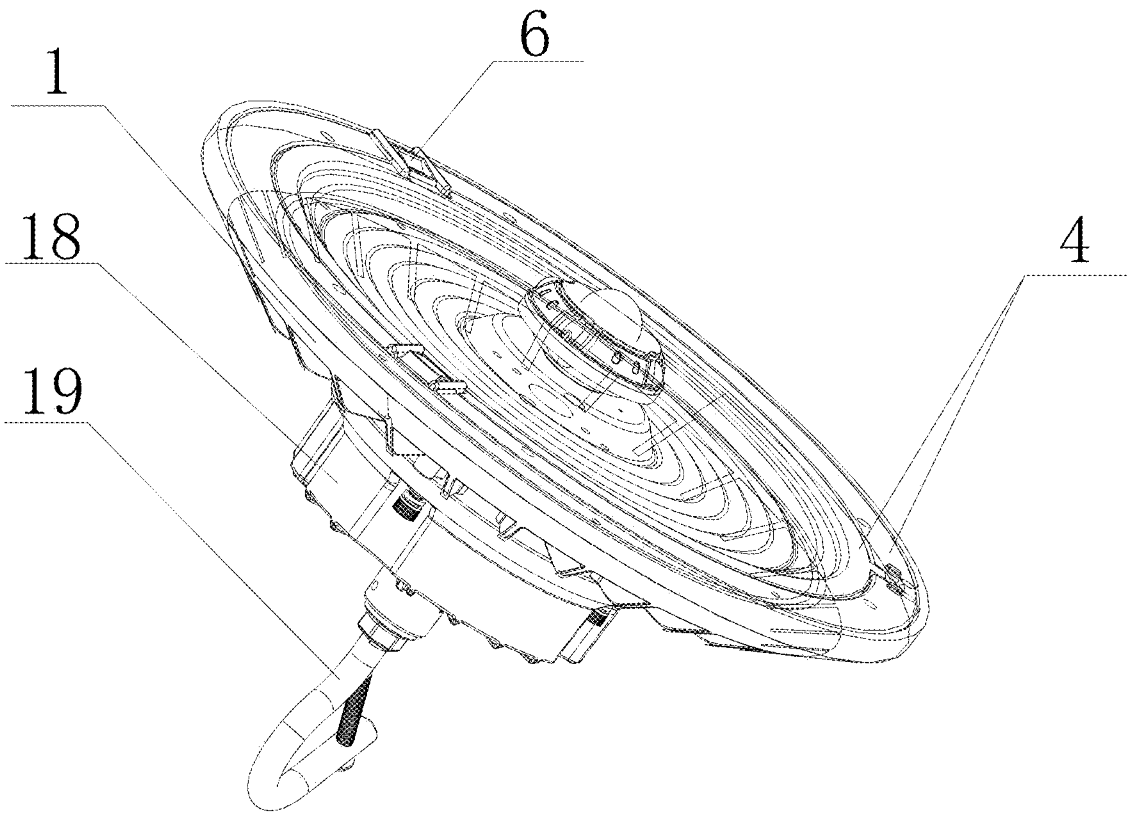
FIG. 1 is a perspective view of an LED lamp according to an embodiment of the present disclosure.
Figure 2:
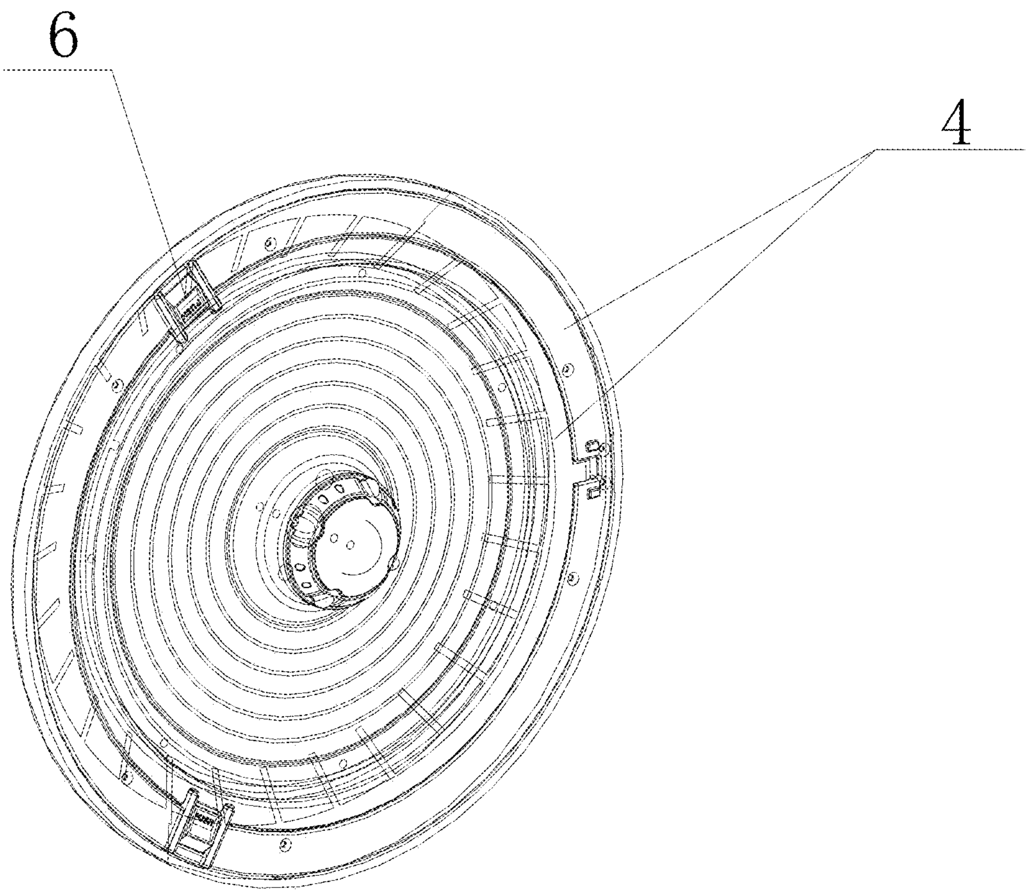
FIG. 2 is similar to FIG. 1, but viewed from another aspect.

1. Heat dissipation lamp holder; 2. LED lamp panel; 3. Light transmitting panel; 4. Fastener; 5. First elastic resetting member; 6. Button; 7. Connecting portion; 8. Pressing ring; 9. Engaging ring; 10. Groove; 11. Opening; 12. First connecting column; 13. Column hole; 14. Second connecting column; 15. Column groove; 16. Second elastic resetting member; 17. Sealing ring; 18. Driving power supply; 19. Hook.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 11, an LED lamp is provided according to an embodiment of the present disclosure. The LED lamp includes a heat dissipation lamp holder 1, an LED lamp panel 2, a light transmitting panel 3, and a locking assembly. The LED lamp panel 2 is mounted on a front side of the heat dissipation lamp holder 1. The light transmitting panel 3 covers the LED lamp panel 2. The locking assembly includes an engaging member 4, a first elastic resetting member 5, and a button 6. The engaging member 4 is movably mounted on the heat dissipation lamp holder 1. The button 6 is hinged to the heat dissipation lamp holder 1 and is provided with a connecting portion 7. The connecting portion 7 is engaged with the engaging member 4 to enable the engaging member 4 to press against the light transmitting panel 3, so as to lock the light transmitting panel 3. The first elastic resetting member 5 is connected to the button 6 and abuts against the heat dissipation lamp holder 1. When the button 6 is pressed, the first elastic resetting member 5 is compressed, and the connecting portion 7 is disengaged from the engaging member 4, so that the engaging member 4 unlocks the light transmitting panel 3.

By arranging the locking assembly, when the light transmitting panel 3 needs to be removed, only the button 6 can be pressed manually, and the engaging member 4 can be disengaged from the connecting portion 7. At this time, the engaging member 4 moves away from the light transmitting panel 3 under the action of the gravity of the engaging member 4 or an external force, so as to unlock the light transmitting panel 3, and the light transmitting panel 3 can be removed manually without an additional tool. Correspondingly, when the light transmitting panel 3 needs to be mounted, the engaging member 4 is disengaged from the connecting portion 7, and the light transmitting panel 3 is provided in a mounting position, then the engaging member 4 is manually pushed to be engaged with the connecting portion 7 At this time, the engaging member 4 can abut against the light transmitting panel 3 and lock the light transmitting panel 3 on the heat dissipation lamp holder 1, the operation is simple and fast, no additional tools are required.

Figure 3:
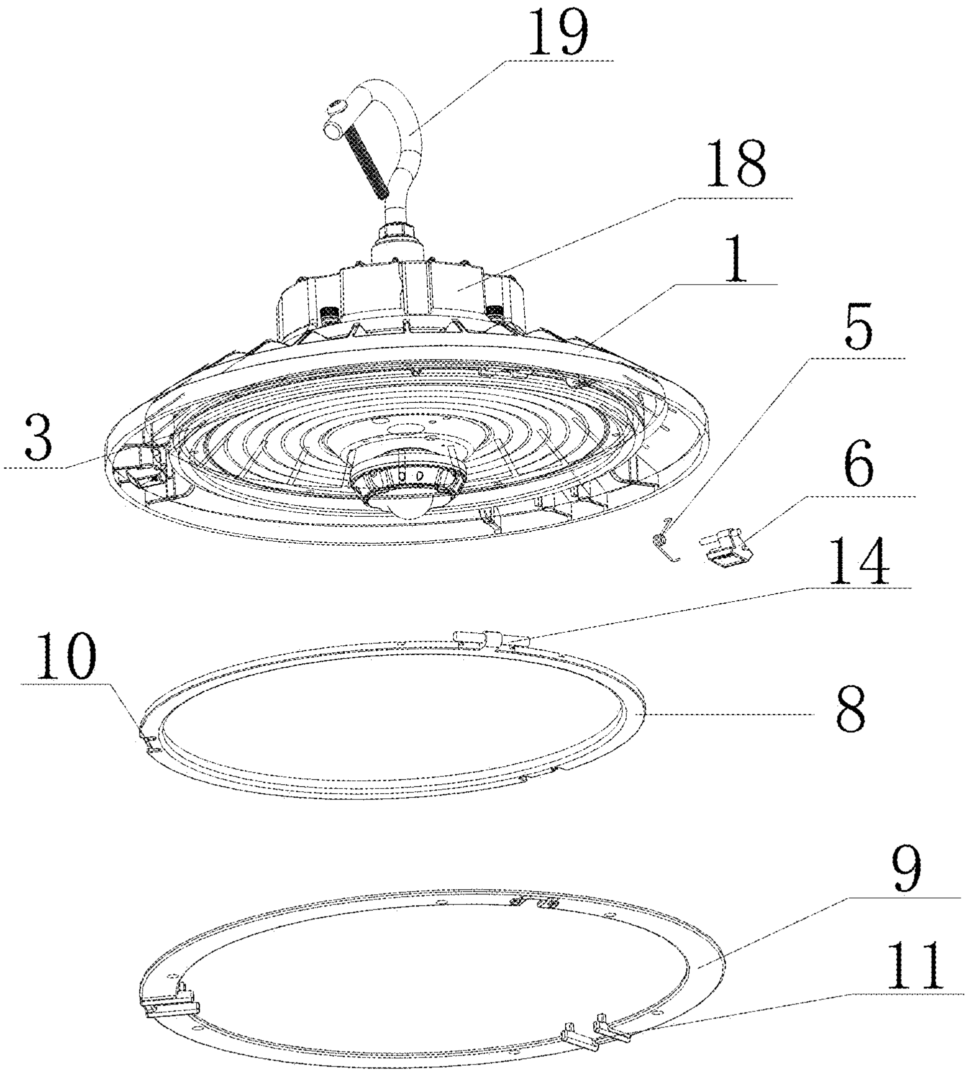
FIG. 3 is a first exploded view of the LED lamp of FIG. 1.
Figure 4:
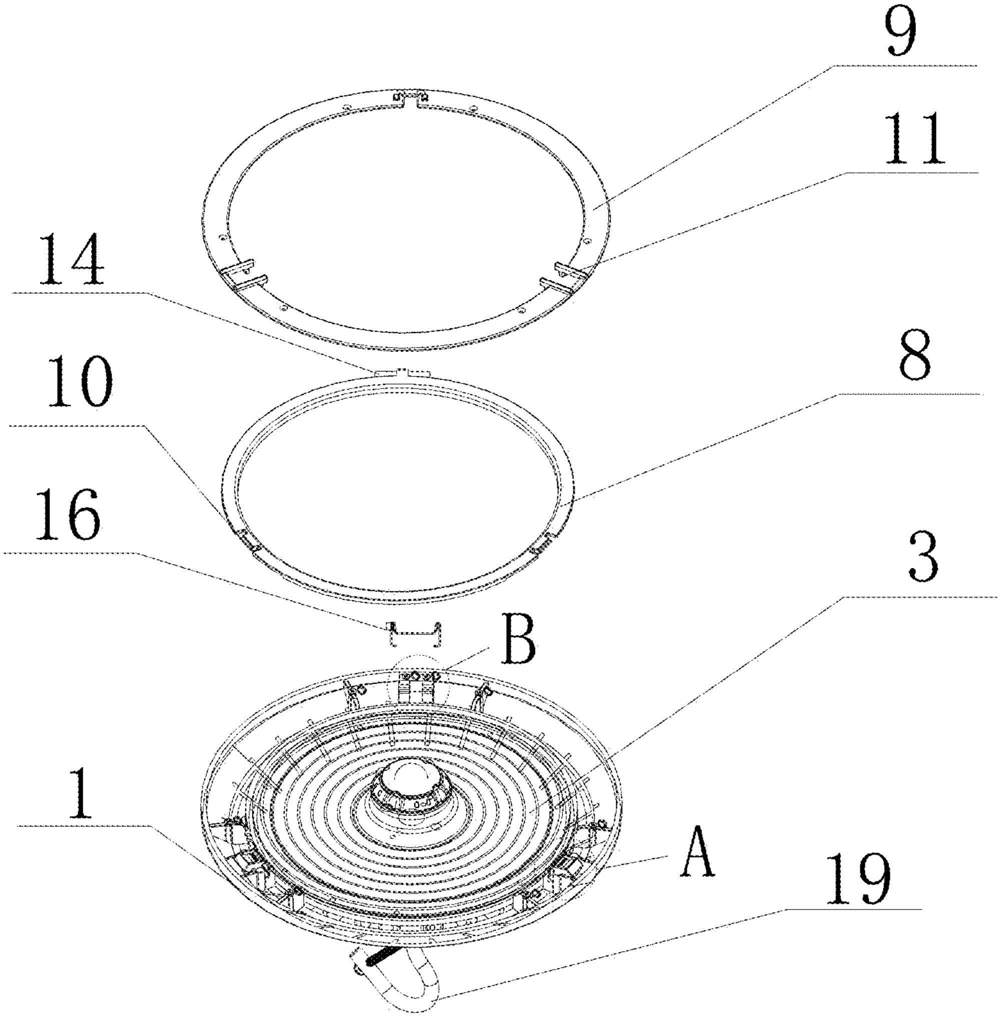
FIG. 4 is a second exploded view of the LED lamp of FIG. 1.
Figure 5:
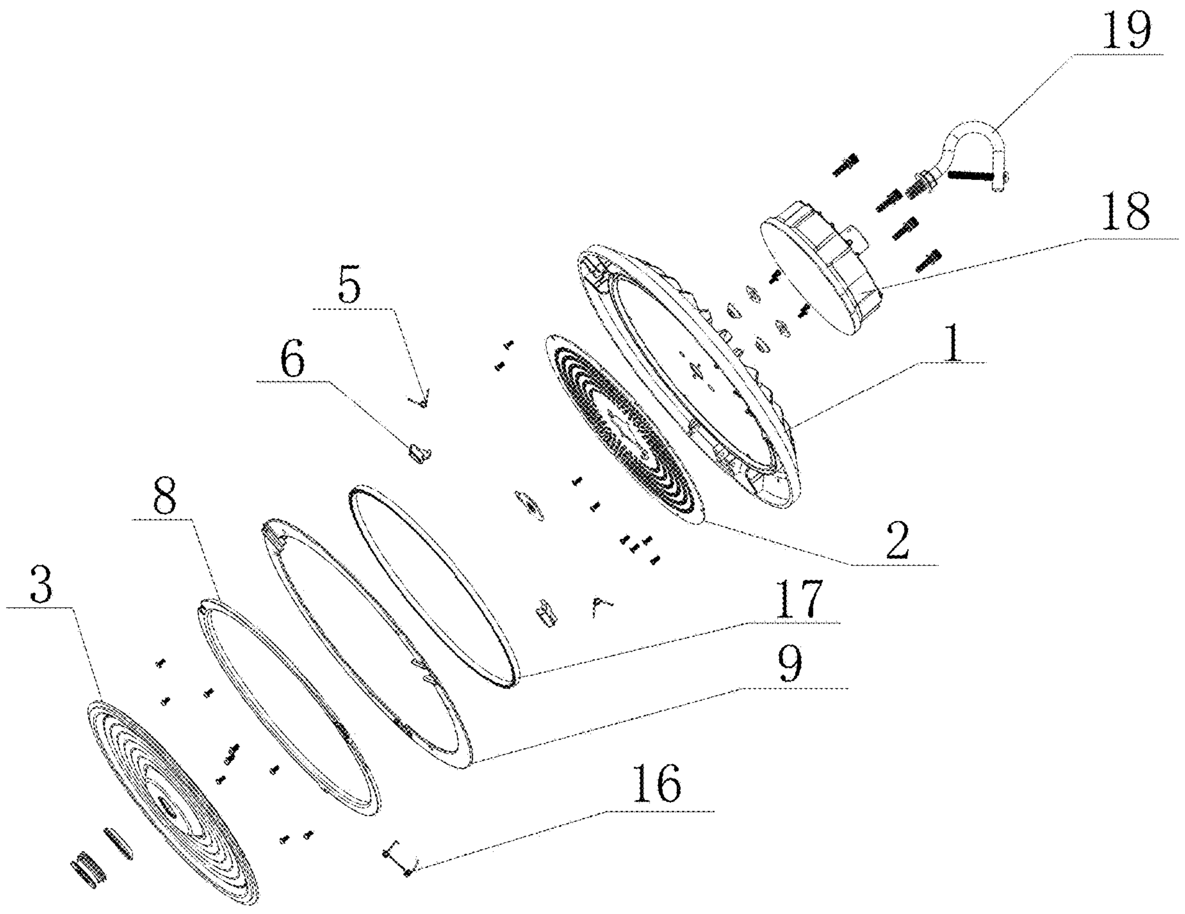
FIG. 5 is a third exploded view of the LED lamp of FIG. 1.

Referring to FIG. 3 and FIG. 4, the engaging member 4 includes a pressing frame 8 and an engaging ring 9. The pressing frame 8 is hinged to the heat dissipation lamp holder 1 and can abut against the light transmitting panel 3. An edge of the pressing frame 8 is provided with a groove 10. When the connecting portion 7 is engaged with the engaging member 4, the connecting portion 7 is engaged in the groove 10. The engaging ring 9 is fixedly mounted on the heat dissipation lamp holder 1. The engaging ring 9 is provided with an opening 11, and the button 6 is placed in the opening 11. In an alternative embodiment, the engaging ring 9 may be omitted, the button 6 is provided in the groove 10, and when the connecting portion 7 is engaged with the engaging member 4, the connecting portion 7 is also engaged in the groove 10.

Figure 6:
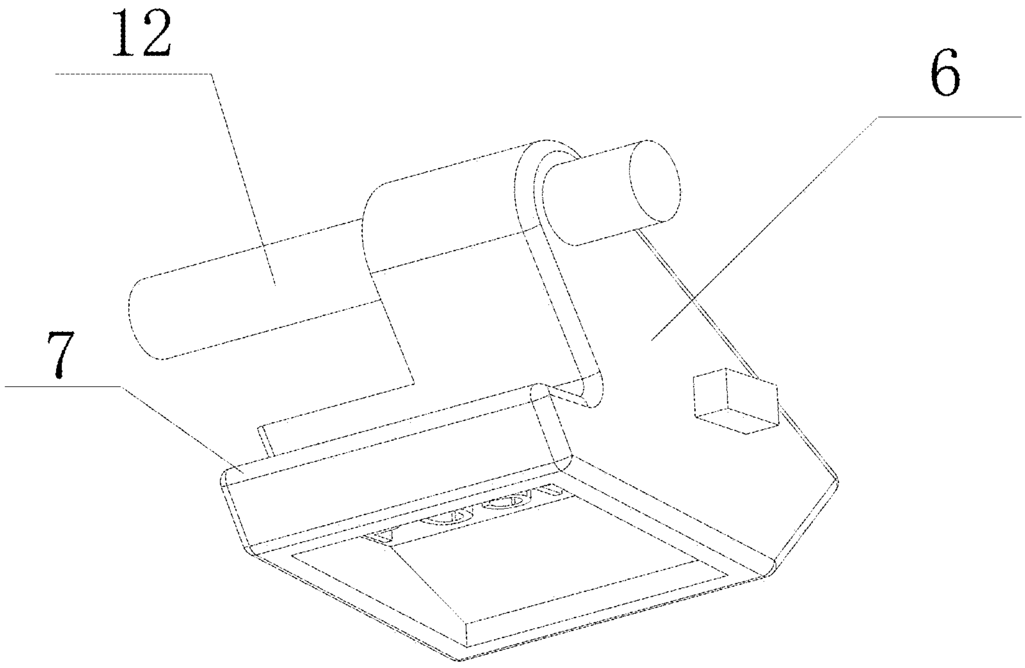
FIG. 6 is an enlarged view of a button shown in FIG. 3.
Figure 7:
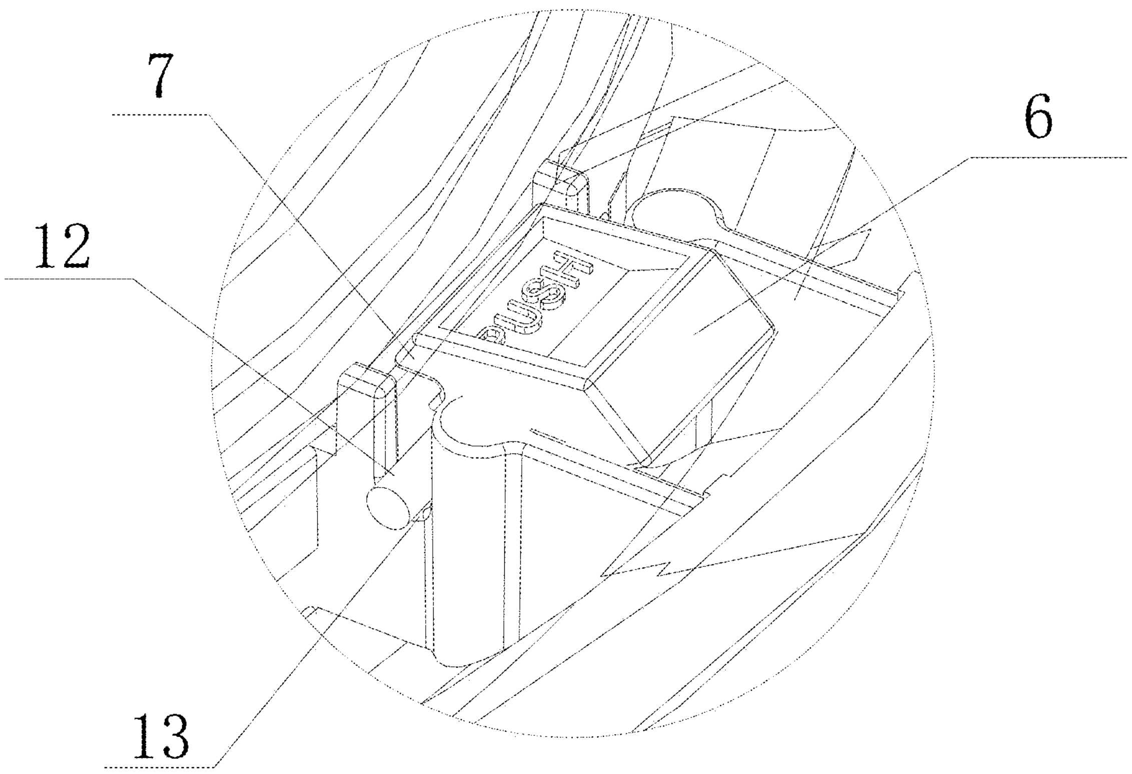
FIG. 7 is an enlarged view of portion A of FIG. 4.
Figure 8:
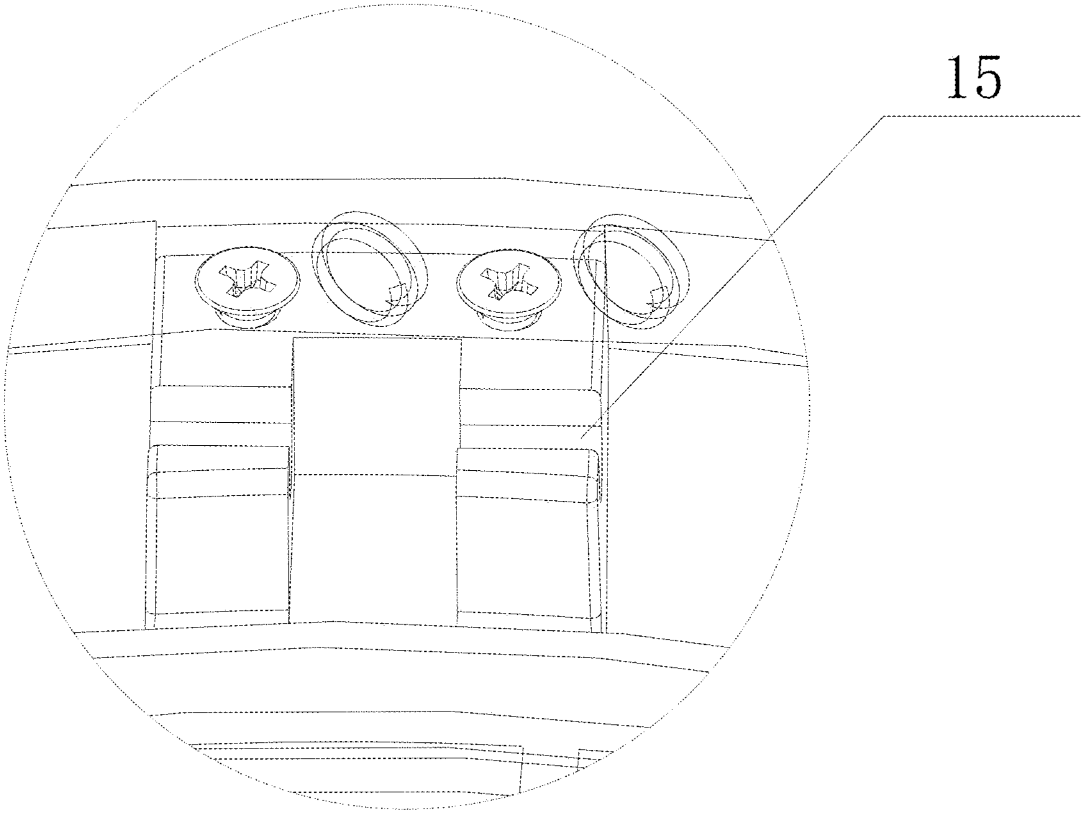
FIG. 8 is an enlarged view of portion B of FIG. 4.

Referring to FIG. 6, the button 6 is provided with a first connecting column 12, the heat dissipation lamp holder 1 is provided with a column hole 13 corresponding to the first connecting column 12, and the first connecting column 12 is rotatably received in the column hole 13. The first elastic resetting member 5 is sleeved on the first connecting column 12 to enable the button 6 to be reset.

Figure 9:
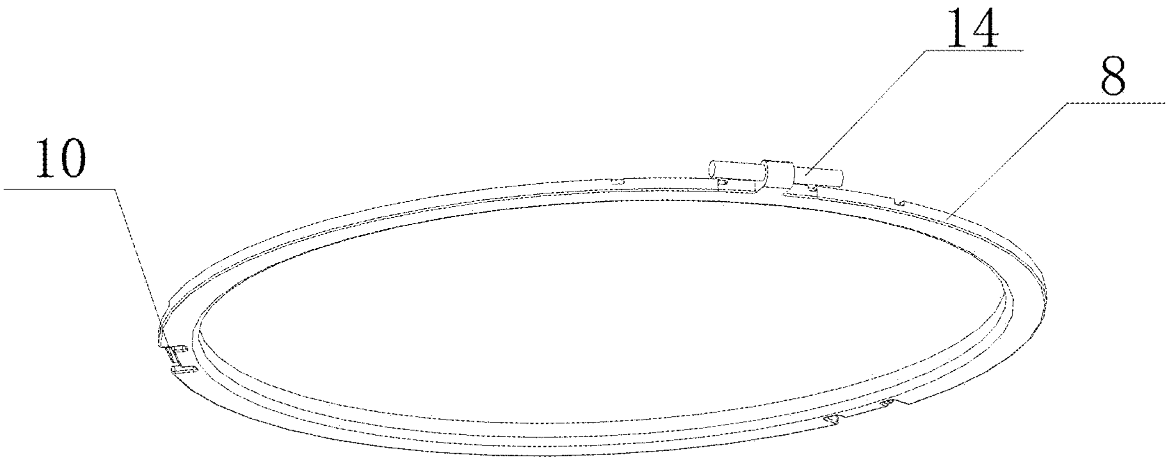
FIG. 9 is an enlarged view of a pressing ring shown in FIG. 3.
Figure 10:
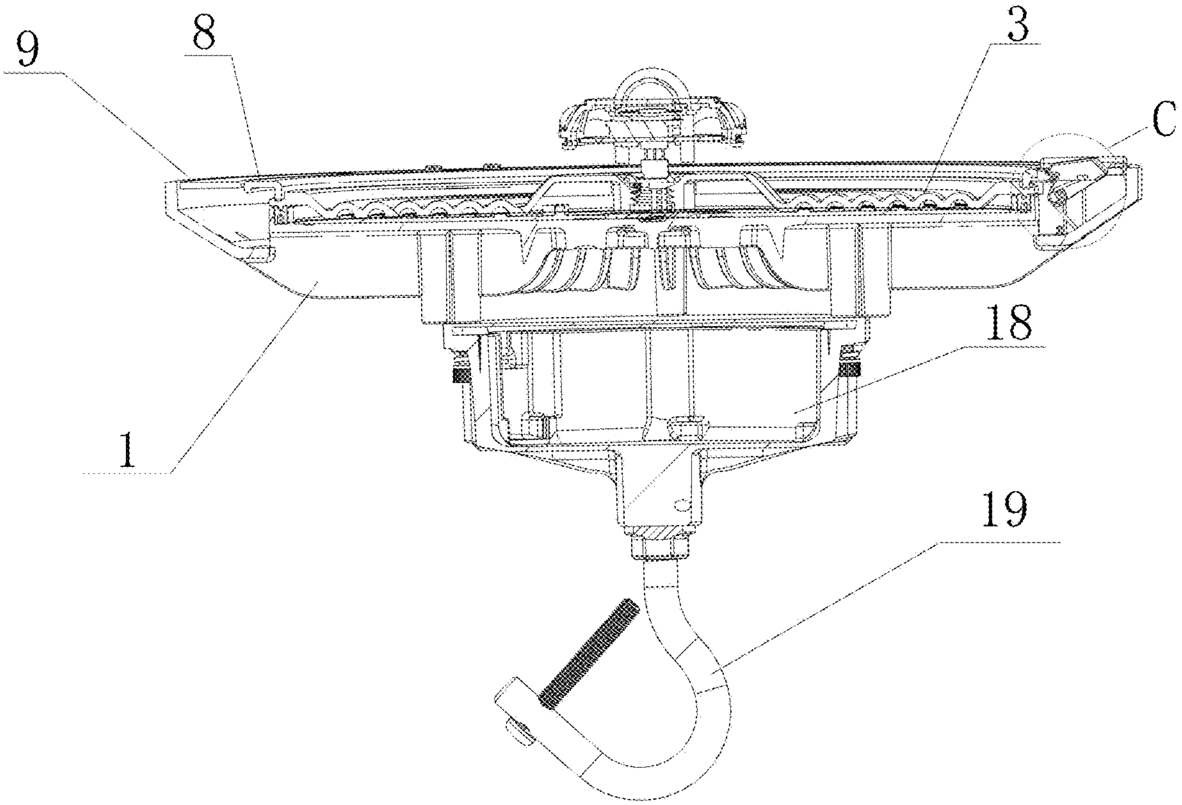
FIG. 10 is a cross-sectional view of the LED lamp.
Figure 11:
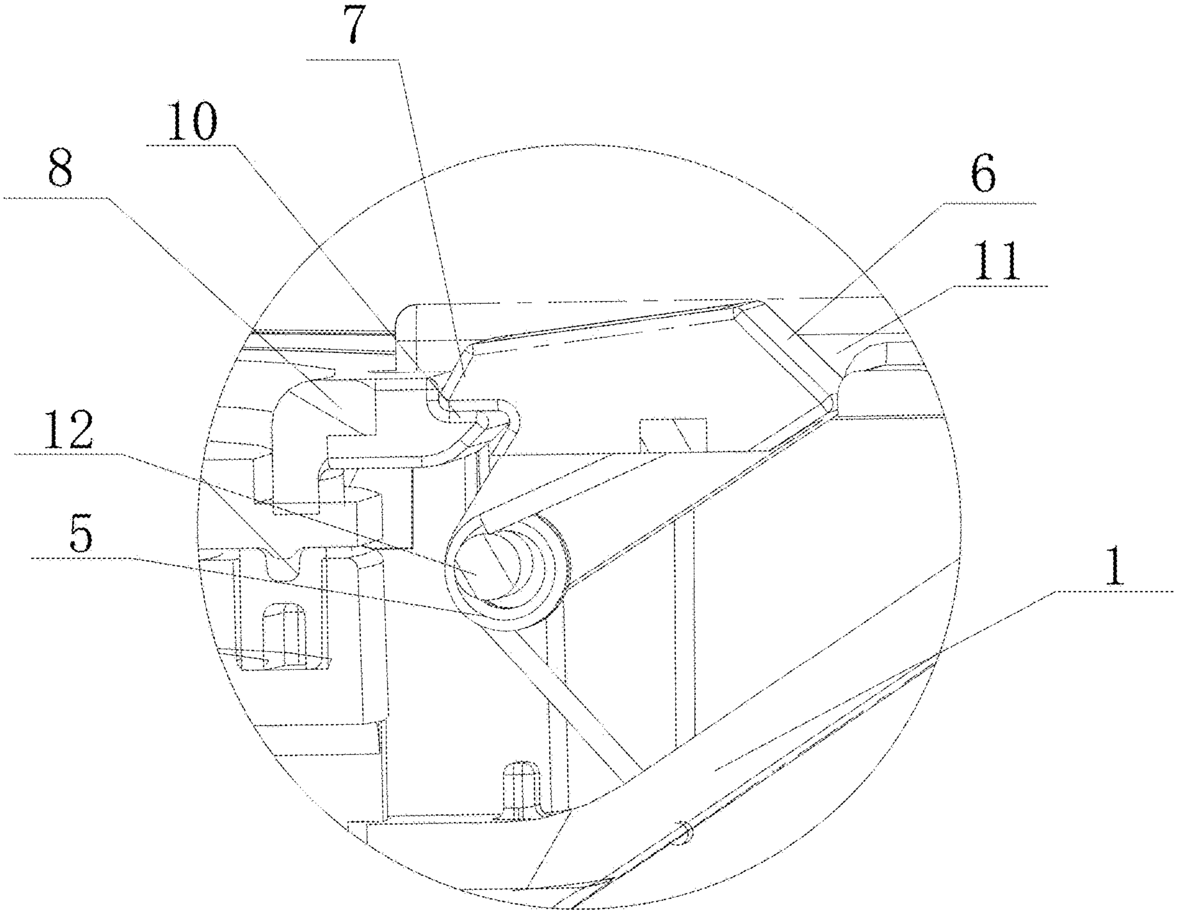
FIG. 11 is an enlarged view of portion C of FIG. 10.

Referring to FIG. 9, the pressing frame 8 is provided with a second connecting column 14, the heat dissipation lamp holder 1 is provided with a column groove 15 corresponding to the position of the second connecting column 14, and the second connecting column 14 is rotatably received in the column groove 15.

The locking assembly further includes a second elastic resetting member 16 sleeved on the second connecting column 14, and both ends of the second elastic resetting member 16 abuts against the pressing frame 8 and the heat dissipation lamp holder 1, respectively. When the pressing frame 8 is pressed against the light transmitting panel 3, the second elastic resetting member 16 is in a compressed state. When the pressing frame 8 is disengaged from the connecting portion 7, the second elastic resetting member 16 is reset to drive the pressing frame 8 to rotate away from the light transmitting panel 3, so that the pressing frame 8 can be opened more conveniently to remove the light transmitting panel 3.

The light transmitting panel 3 is a lens panel with a lens structure.

The LED lamp further includes a sealing ring 17 provided between the light transmitting panel 3 and the LED lamp panel 2, so that the LED lamp can achieve a good waterproof effect.

Both the first elastic resetting member 5 and the second elastic resetting member 16 are torsion springs.

Two first elastic resetting members 5 and two buttons 6 may be provided. The pressing frame 8 can be pressed against the light transmitting panel 3 more firmly.

The LED lamp further includes a driving power supply 18 mounted on a back side of the heat dissipation lamp holder 1, and the driving power supply 18 is electrically connected to the LED lamp panel 2. The LED lamp further includes a hook 19 connected to the driving power supply 18.

According to the above-mentioned LED, the light transmitting panel 3 can be removed manually for replacement or maintenance without the additional tool, and the operation is simple and convenient.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a heat dissipation lamp holder;

an LED lamp panel mounted on a front side of the heat dissipation lamp holder;

a light transmitting panel covering the LED lamp panel; and a locking assembly comprising:

an engaging member movably mounted on the heat dissipation lamp holder;

a button hinged to the heat dissipation lamp holder; and a first elastic resetting member connected to the button and abutting against the heat dissipation lamp holder;

wherein the button is provided with a connecting portion engaged with the engaging member to enable the engaging member to lock the light transmitting panel, when the button is pressed, the first elastic resetting member is compressed, and the connecting portion is disengaged from the engaging member, so that the engaging member unlocks the light transmitting panel;

the engaging member comprises a pressing frame and an engaging ring, the pressing frame presses against the light transmitting panel and is hinged to the heat dissipation lamp holder, an edge of the pressing frame is provided with a groove, the engaging ring is fixedly mounted on the heat dissipation lamp holder, the engaging ring is provided with an opening, the button is provided in the opening, when the connecting portion is engaged with the engaging member, the connecting portion is engaged in the groove.

2. The LED lamp according to claim 1, wherein the button is provided with a first connecting column, the heat dissipation lamp holder is provided with a column hole corresponding to the first connecting column, the first connecting column is rotatably received in the column hole, and the first elastic resetting member is sleeved on the first connecting column.

3. The LED lamp according to claim 2, wherein the pressing frame is provided with a second connecting column, the heat dissipation lamp holder is provided with a column groove corresponding to the position of the second connecting column, and the second connecting column is rotatably received in the column groove.

4. The LED lamp according to claim 3, wherein the locking assembly further comprises a second elastic resetting member sleeved on the second connecting column, and both ends of the second elastic resetting member abuts against the pressing frame and the heat dissipation lamp holder, respectively.

5. The LED lamp according to claim 4, wherein both the first elastic resetting member and the second elastic resetting member are torsion springs.

6. The LED lamp according to claim 1, wherein two first elastic resetting members and two buttons are provided.

7. The LED lamp according to claim 1, further comprising:

a driving power supply mounted on a back side of the heat dissipation lamp holder and electrically connected to the LED lamp panel; and a hook connected to the driving power supply.

8. The LED lamp according to claim 1, wherein the light transmitting panel is a lens panel.

9. The LED lamp according to claim 1, further comprising a sealing ring provided between the light transmitting panel and the LED lamp panel.

* * * * *